United States Patent [19]
Salzman

[11] 4,108,489
[45] Aug. 22, 1978

[54] COLLAPSIBLE CHILD SEATS

[76] Inventor: Marilyn F. Salzman, 355 Dungate Dr., Chesterfield, Mo. 63017

[21] Appl. No.: 752,065

[22] Filed: Dec. 20, 1976

[51] Int. Cl.² ............................................. A47D 1/10
[52] U.S. Cl. .................................. 297/37; 297/250; 280/33.99 B
[58] Field of Search ............... 297/250, 254, 255, 256, 297/36, 37, DIG. 6, 230; 280/33.99 B, 47.35

[56] References Cited
U.S. PATENT DOCUMENTS

| 825,540 | 7/1906 | Hughes | 297/37 X |
|---|---|---|---|
| 2,418,731 | 4/1947 | Seitz | 297/250 X |
| 2,555,566 | 6/1951 | Bleck | 297/37 X |
| 2,580,935 | 1/1952 | Lovelace | 297/37 X |
| 2,960,149 | 11/1960 | Throssel | 297/254 X |
| 2,979,121 | 4/1961 | Gates | 297/255 |
| 2,998,978 | 9/1961 | Sides | 280/33.99 B |
| 3,578,380 | 5/1971 | Jacobus | 297/229 |
| 3,929,375 | 12/1975 | Gans | 297/DIG. 6 |

*Primary Examiner*—Francis K. Zugel
*Attorney, Agent, or Firm*—Richard J. Sher

[57] ABSTRACT

Collapsible child seats especially for use with conventional shopping carts and having side restraining flaps for preventing a child, and especially an infant, from falling laterally to either side. According to one preferred embodiment of the invention the fully collapsed seat may be carried in a woman's purse to the supermarket where it is easily unfolded and secured in the shopping cart. In other preferred embodiments, the invention is permanently attached to the shopping cart for use in transporting an infant and is collapsible in a unique manner to allow for the use of the seat without the side restraining flaps as, for example, in the case of the transporting of an older and larger child, and the seat may be further positioned to permit the shopping cart to be utilized without the child seat.

6 Claims, 10 Drawing Figures

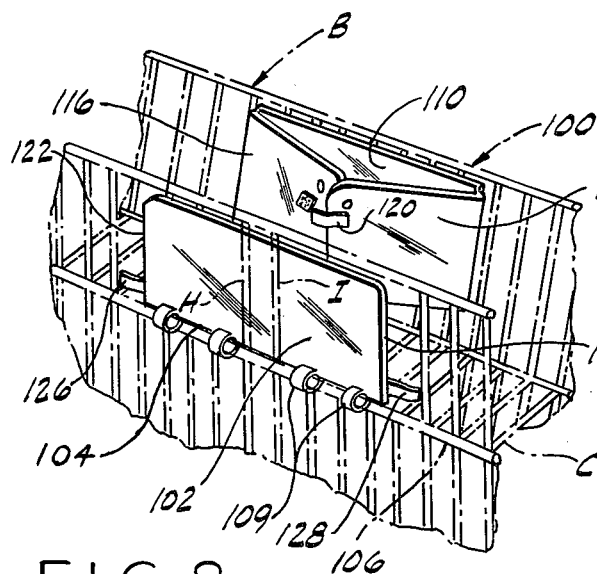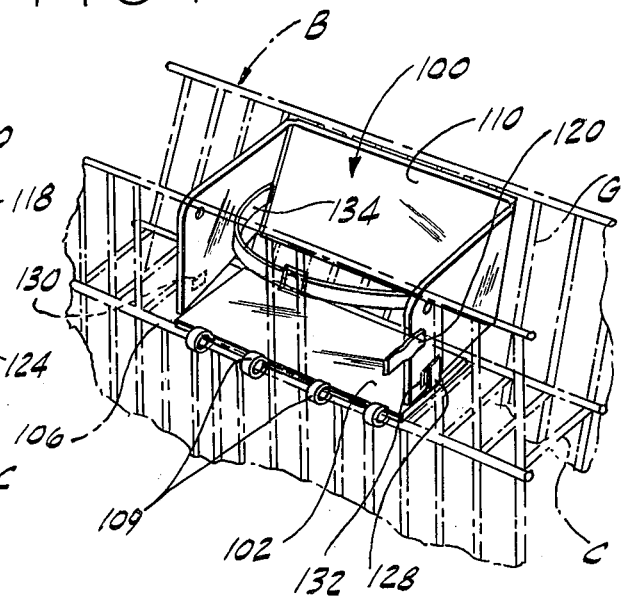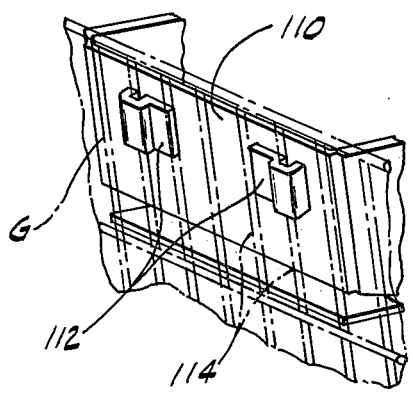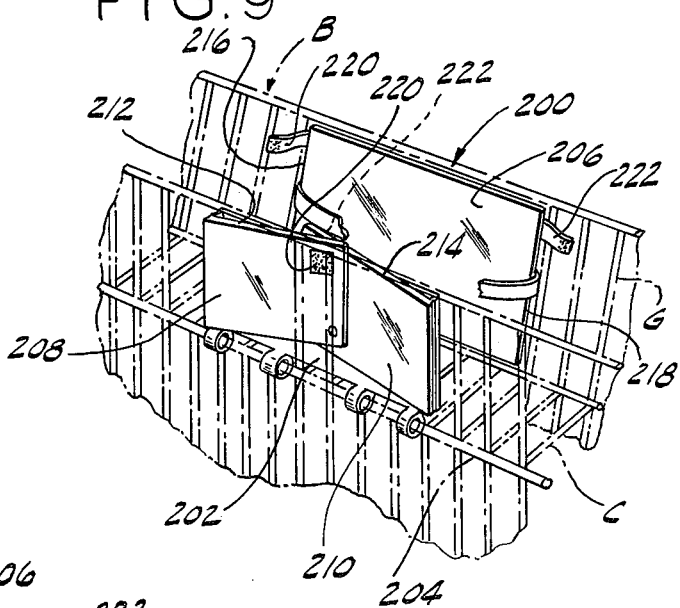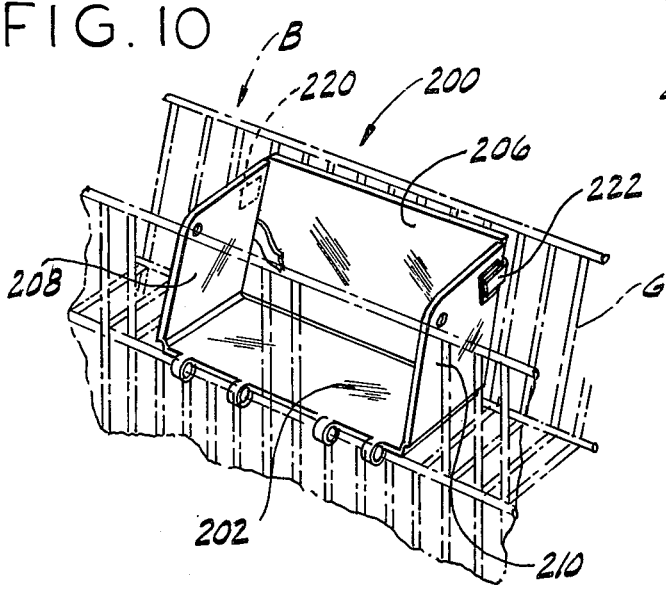

ically remain seated in an upright position. It is commonplace for an infant to fall or slump laterally when positioned upright in a shopping cart child seat thus rendering the child seat useless and even dangerous.

Another problem encountered in the use of child seat structures provided in conventional shopping carts is that older children placed therein many times try to extricate themselves therefrom and thereby create the possibility of accident such as falling out of the cart.

The present invention remedies the above-mentioned problems inherent in conventional shopping cart child seats by providing economical child seat structures embodying means for preventing a child placed therein from falling laterally to either side and means for restraining the child from extricating himself from the seat.

One preferred embodiment of the invention provides a portable seat sized to fit into conventional shopping cart child seat structures. A seat belt is provided for holding a child in the seat, and side restraining flaps are included to prevent the child from falling to either side. In use, the seat is affixed to the cart; however, it can easily be removed from the cart, collapsed and secured in the collapsed position so that it may be carried home in a shopping bag or in a woman's purse.

According to other preferred embodiments of the present invention, the novel child seat may be manufactured as original equipment on new shopping carts, or it may be permanently added to existing shopping carts. While these embodiments perform the same functions of preventing lateral falls and otherwise restraining the child, they are also constructed so that they may effortlessly be collapsed in the cart to permit the use thereof without the side restraining flaps or to permit the use of the cart without a child seat.

It is, therefore, an object of the invention to provide improved child seats for use with shopping carts and the like which prevent a small child or infant from falling laterally to either side when placed in the shopping cart seat.

It is another object of the instant invention to provide means for restraining a child from extricating himself from a shopping cart seat.

It is still another object of the invention to provide a portable child seat which is constructed to permit the facile collapse thereof and the securing thereof in such collapsed condition.

It is still another object of the invention to provide a versatile child seat structure which may be permanently affixed to a shopping cart and which is collapsible to allow for the use thereof for smaller children requiring side restraints; for older children not requiring side restraints; and, for use of the cart without a child seat.

These as well as other objects and advantages will become more apparent upon a reading of the hereinbelow detailed description of the preferred embodiments of the instant invention in conjunction with the drawings wherein:

FIG. 6 is a perspective view of an alternate embodiment of the invention affixed to a shopping cart and in a collapsed position;

FIG. 7 is a perspective view of the embodiment of FIG. 6 in the ready position;

FIG. 8 is a perspective view of the rear of the child seat structure of FIG. 7;

FIG. 9 is a perspective view of another embodiment of the invention affixed to a shopping cart and in a collapsed position; and, FIG. 10 is a perspective view of the embodiment of FIG. 9 in the ready position.

DETAILED DESCRIPTION OF THE PREFERRED EMBODIMENTS

Figure 1:
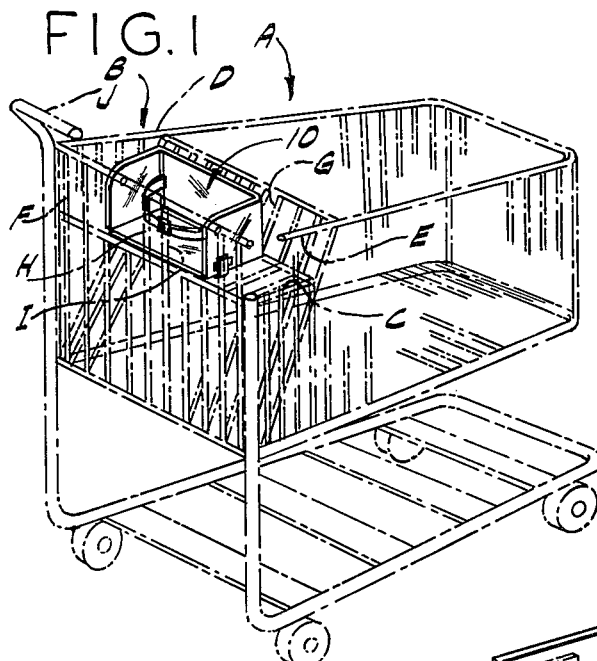
FIG. 1 is a perspective view of the invention as utilized in a conventional shopping cart.

With reference to the drawings and FIG. 1 in particular, there is shown a portable child seat 10 depicted as it would be used in a conventional child seat structure of a conventional shopping cart A. It is noted that a portion of the shopping cart A has been cut away to more clearly show the position of child seat 10 therein.

Shopping cart A is of any conventional design having a child seat structure B which includes a substantially horizontal platform C constructed of parallel, spaced heavy gauge wire. As shown, platform C extends along the entire width of shopping cart A, that is, from side D to side E. Child seat structure B of cart A also includes a rear wall F and a forward wall G, each also formed of parallel, spaced wire. Rear wall F is provided with two openings therein H and I for accommodating the legs of a child placed in child seat structure B, which child would be facing the operator pushing cart A by means of cart handle J (only partially shown). It is believed that this brief description of shopping cart A is sufficient to establish a foundation for describing the child seat 10 of the instant invention, and since the shopping cart per se forms no part of the invention, no further details of the cart structure are deemed necessary.

Figure 2:
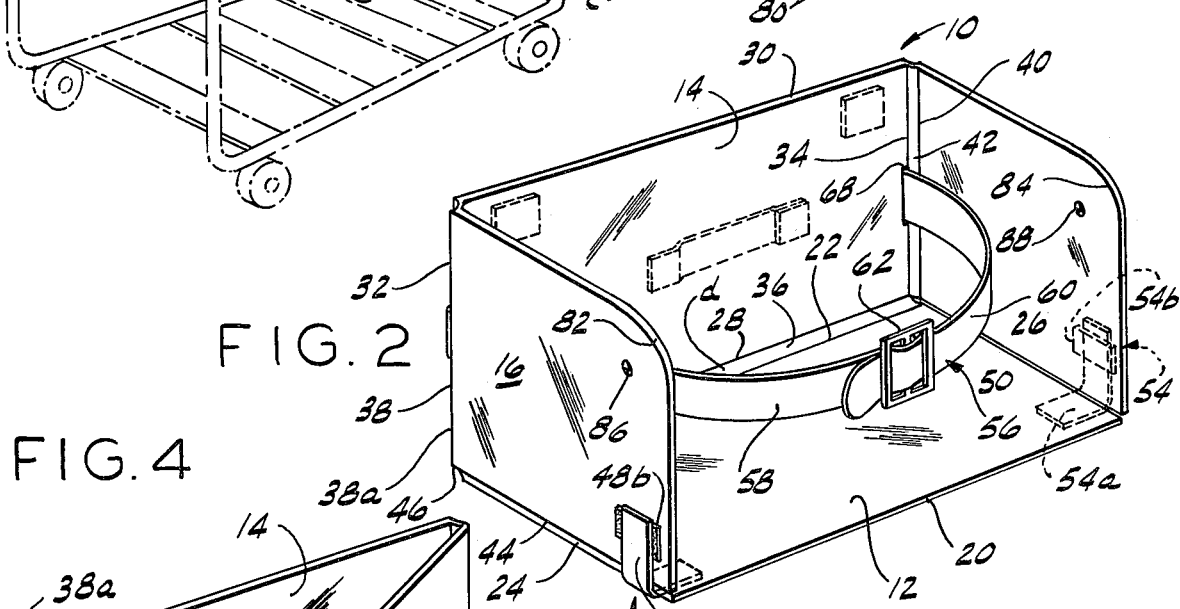
FIG. 2 is an enlarged perspective view of the novel child seat per se.

With reference to FIG. 2, child seat 10 is shown having a seat panel 12, a back panel 14 and two side restraining flaps 16 and 18. Panels 12 and 14 and flaps 16 and 18 may be fabricated of any sturdy and durable material such as plastic. Seat panel 12 includes two parallel side edges 20 and 22 and two parallel end edges 24 and 26. Back panel 14 likewise includes two parallel side edges 28 and 30 and two parallel end edges 32 and 34. Side edge 22 of seat panel 12 is coextensive with side edge 28 of back panel 14 and is hinged thereto as by means of a flexible, integral hinge portion 36 which is of a width $d$ approximately twice the thickness of side restraining flaps 16 and 18. Upwardly extending edge 38 of side flap 16 is coextensive with and integrally hinged along hinge line 38a to end edge 32 of back panel 14, and edge 40 of side flap 18 is coextensive with and hinged to end edge 34 of back panel 14 along integral hinge portion 42 which is of a width slightly greater than the thickness of side flap 16.

Side flap 16 includes a lower, horizontally disposed edge 44 adjoining edge 38 at corner 46 and edge 44 as shown is in coextensive relationship with end edge 24 of seat panel 12 where it is secured in position by securing means 48. Side flap 18 includes a lower, horizontally disposed edge 50 adjoining edge 40 at corner 52 and edge 50 as shown is in coextensive relationship with end edge 26 of seat panel 12 where it is secured in position by securing means 54.

Securing means 48 and 54 may be of numerous constructions and are shown as including a VELCRO tab 48a, 54a glued to the underside of seat panel 12 and extending upwardly to adhere to VELCRO mating pads 48b, 54b glued to respective side flaps 16 and 18.

Figure 3:
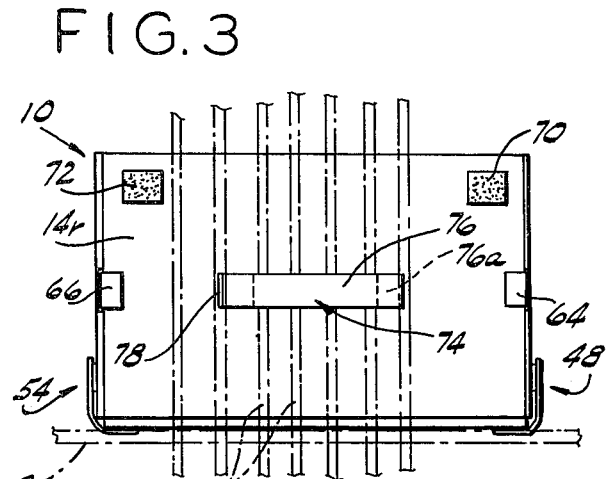
FIG. 3 is a rear elevational view of the child seat.

A seat belt 56 of any conventional design is provided for seat 10 and includes two sections 58 and 60 adjustably joined by buckle 62. The ends 64 and 66 of respective sections 58, 60 pass through slots 68 in back panel 14 and are affixed as by gluing to the rear side 14r of back panel 14 as shown in FIG. 3. Also provided on the rear side 14r of back back pane 14 are a pair of VELCRO pads 70, 72 positioned so as to mate with respective tabs 48a, 54a when the seat 10 is collapsed as will be explained hereinafter. Rear side 14r of back panel 14 is further provided with a connector 74 for connecting seat 10 to forward wall G of child seat structure B in shopping cart A. Connector 74 preferably includes a VELCRO strap 76 glued at one end thereof 76a to back panel 14 and a mating VELCRO pad 78 horizontally spaced from end 76a. As shown, strap 76 may be wrapped around a few of the wires 80 forming a part of forward wall G and pressed against pad 78 to secure the child seat 10 in a position midway between sides D and E of cart A.

It is noted that side restraining flaps 16 and 18 have rounded corners 82, 84 diagonally opposite respective corners 46, 52 to further reduce the possibility of injury to a child placed in seat 10. Further, adjacent corners 82, 84 there are provided holes 86, 88 for the purpose of facilitating the connection of a child's toy to seat 10 in a convenient position for entertaining a child. The diameter of holes 86, 88 is less than ¼ inch to prevent an infant from lodging a finger therein.

Figure 4:
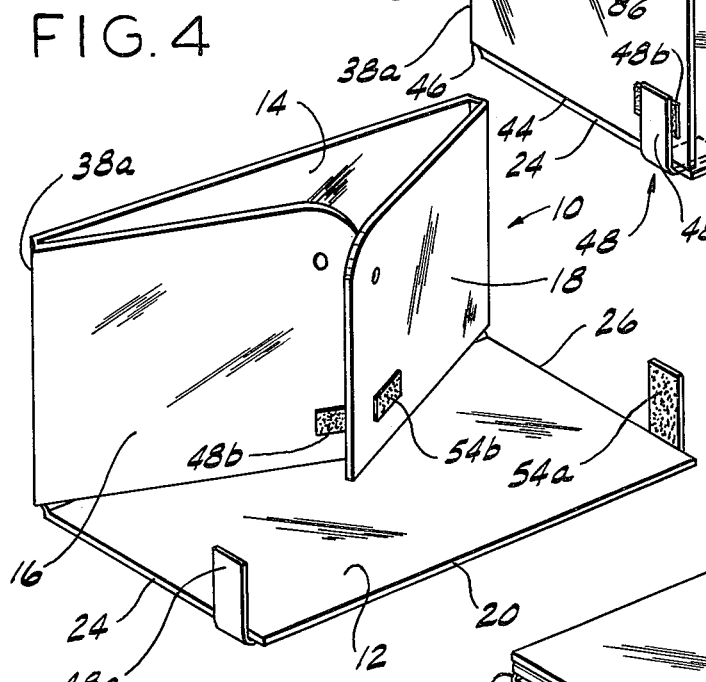
FIG. 4 is a perspective view of the child seat partially collapsed.

Child seat 10 may be easily removed from cart A by separation of strap 76 and pad 78 on the rear side 14r of back panel 14. Thereafter seat 10 may be collapsed as shown in FIGS. 4 and 5 by peeling VELCRO tabs 48a, 54a from pads 48b, 54b; folding side flap 16 onto back panel 14 along line 38a; folding side flap 18 onto side flap 16; folding seat panel 12 onto side flap 18; and securing tabs 48a, 54a to pads 70 and 72 respectively.

Figure 5:
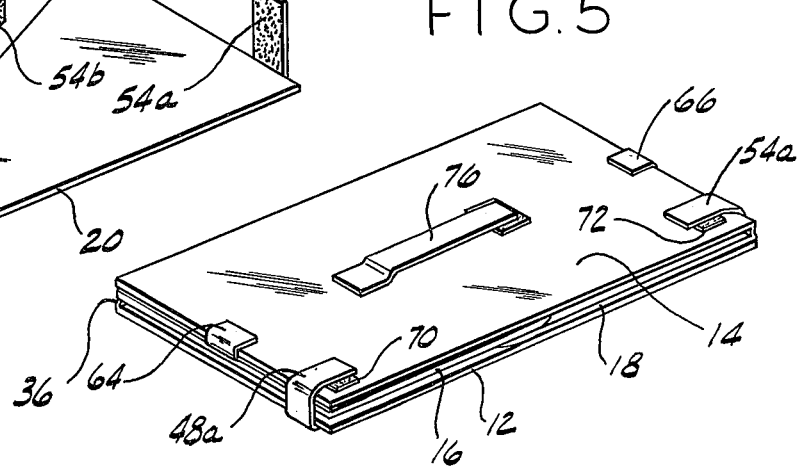
FIG. 5 is a perspective view of the child seat fully collapsed.

Since the child seat 10 is sized to fit into a conventional shopping cart seat structure, the dimensions of the seat 10 when collapsed as shown in FIG. 5 will be approximately 10½ × 7 inches × ¾ inch, thus it may be conveniently carried in a woman's purse.

FIGS. 6, 7 and 8 depict another embodiment of the invention wherein child seat embodiment 100 may be permanently attached to a shopping-cart child seat structure B. Child seat 100 includes a seat panel 102 having the forward side edge 104 coextensive with a horizontal cross-bar 106 of horizontal platform C and is hinged thereto preferably by a plurality of clips 109 integrally formed with seat panel 102. As shown in FIG. 6 seat panel 102 may be positioned upright whereat openings H and I are blocked, thereby allowing cart seat structure B to be utilized to carry commodites when a child seat is not necessary. Back panel 110 is secured to forward wall G within child seat structure B by means of clips 112 integrally formed on the rear surface of back panel 110. Clips 112 face in opposite directions and are spaced so that they may be tightly secured to vertical wires 114 of forward wall G. Integrally hinged along the end edges of back panel 110 are side restraining flaps 116 and 118. As shown in FIG. 6, side flaps 116, 118 may be conveniently folded upon back panel 110 and secured thereat by VELCRO connector 120.

When it is desired to use child seat 100 for a larger child who does not require side restraints, seat panel 102 is pivoted down upon platform C. When the seat is to be used for a small child or infant, side flaps 116, 118 are pulled apart and the bottom edges thereof are positioned to coextend over end edges 122, 124 of seat panel 102. Thereafter VELCRO tabs 126, 128 secured to seat panel 102 are pressed onto mating VELCRO pads 130, 132 on respective side flaps 116, 118 to thereby secure the side flaps in a position to restrain lateral movement of the child placed therebetween. It is noted that the embodiment 100 also includes a seat belt 134 similar to that of child seat 10 described hereinabove. It is further pointed out that most shopping carts having child seat structures C are provided with the hinged seat panel 102 and, therefore, in order to convert such a seat structure to that of the present invention would simply require the addition of the combined back panel 110 and side flaps 116, 118 which can easily be clipped onto forward wall G of seat structure C, and the placement of VELCRO tabs 126, 128 on seat panel 102.

FIGS. 9 and 10 depict another embodiment of the invention which is permanently affixed to a shopping cart. Child seat 200 includes seat panel 202 hinged at the forward side edge thereof to horizontal cross-bar 204 of platform C, and back panel 206 clipped onto forward wall G within child seat structure B. Child seat 200 differs from the embodiment of FIGS. 6-8 primarily in that side restraining flaps 208, 210 are hinged to the end edges of seat panel 202 and may be folded thereon when not in use as shown in FIG. 9. When seat panel 202 is pivoted down upon platform C, side flaps 208, 210 may be raised until the respective rear edges thereof 212, 214 are coextensive with end edges 216, 218 of back panel 206 whereat they are secured by VELCRO securing means 220, 222 as shown in FIG. 10.

It can thus be appreciated that a child seat for use with shopping carts according to the principles of the invention will prevent a small child or infant placed therein from falling laterally to either side and will restrain the child from extricating himself from the seat, thereby alleviating the possibility of injury to the child and rendering greater piece of mind and freedom to the parent while shopping. As shown hereinabove, a child seat possessing these advantages can be conveniently carried to the supermarket and placed into a conventional shopping cart, or it may be permanently added to existing shopping-cart child seat structures wherein it may be positioned for use without the side restraining flaps or without the child seat altogether.

Inasmuch as numerous modifications may be made to the construction of the present invention without departing from the spirit and scope thereof, for example, in construction of the embodiment of FIGS. 1-5, the side flaps may be hinged to the seat panel instead of the back panel and releaseably connected to the back panel; any commonly known securing means such as snaps, buttons, etc., can be substituted for the disclosed VELCRO connectors. It is, therefore, requested that the scope of the invention be determined solely by the claims appended hereto.

I claim:

1. In combination, a shopping cart having a child seat structure including a horizontal platform extending along the entire width of said cart between two vertical side walls of said cart; and
    a child seat fitted within said child seat structure, said child seat comprising:
    a first panel having first and second side edges and first and second end edges;
    a second panel having third and fourth side edges and third and fourth end edges;
    said first, second, third and fourth side edges being shorter than the length of said platform;
    first and second restraining flaps, each having a first edge coextensive with and hinged to a respective one of said first and second end edges of said first panel, each of said restraining flaps having a second edge adjoining a respective one of said first edges of said flaps and movable into coextensive relationship with a respective one of said third and fourth end edges of said second panel; and
    securing means for releaseably securing each of said second edges of said restraining flaps in said coextensive relationship;
    said shopping cart having an upstanding forward wall on one side of said platform and an upstanding rearward wall on the opposite side of said platform;
    said second panel being hinged to said shopping cart along said fourth side edge and being pivotable between a position against said rearward wall and a position on said platform; and, said first panel being affixed to the rearward side of said forward wall,
    wherein, when said second edges of said restraining flaps are in said coextensive relationship, said restraining flaps are spaced from said side walls of said cart to thereby prevent a child placed within said child seat from falling laterally against said side walls of said cart.

2. The improved child seat as specified in claim 1 and further characterized by:
    said first panel being a back panel and said second panel being a seat panel;
    an adjustable seat belt extending between said restraining flaps and along a forward surface of said back panel; and
    connecting means on the rear surface of said back panel for releaseably connecting said back panel to said child seat structure of said shopping cart.

3. In combination, a shopping cart having a child seat structure including a horizontal platform extending along the entire width of said cart between two vertical side walls of said cart; and
    a child seat fitted within said child seat structure, said child seat comprising:
    a first panel having first and second side edges and first and second end edges;
    a second panel having third and fourth side edges and third and fourth end edges;
    said first, second, third and fourth side edges being shorter than the length of said platform;
    first and second restraining flaps, each having a first edge coextensive with and hinged to a respective one of said first and second end edges of said first panel, each of said restraining flaps having a second edge adjoining a respective one of said first edges of said flaps and movable into coextensive relationship with a respective one of said third and fourth end edges of said second panel; and securing means for releasably securing each of said second edges of said restraining flaps in said coextensive relationship;
    said shopping cart having an upstanding forward wall on one side of said platform and an upstanding rearward wall on the opposite side of said platform;
    said first panel being hinged to said shopping cart along said first side edge and being pivotable between a position against said rearward wall and a position on said platform; and,
    said second panel being affixed to the rearward side of said forward wall,
    wherein, when said second edges of said restraining flaps are in said coextensive relationship, said restraining flaps are spaced from said walls of said cart to thereby prevent a child placed within said child seat from falling laterally against said side walls of said cart.

4. The improved child seat as specified in claim 3 and further characterized by:
    an adjustable seat belt connected to said second panel.

5. The improved child seat as specified in claim 1 and further characterized by:
    said securing means are comprised of VELCRO adhesive connectors.

6. The improved child seat as specified in claim 1 and further characterized by:
    said restraining flaps having rounded corners diagonally opposite the corners formed by said first and second edges of said flaps.

* * * * *